3,109,690
CABLE CONNECTOR ASSEMBLY
Charles H. Stevens, Jr., Cornwall Bridge, Conn., assignor to Empire Products Inc., Cincinnati, Ohio, a corporation of Ohio
Continuation of application Ser. No. 722,409, Mar. 19, 1958, which is a division of application Ser. No. 461,505, Oct. 11, 1954. This application Dec. 11, 1962, Ser. No. 246,649
2 Claims. (Cl. 339—60)

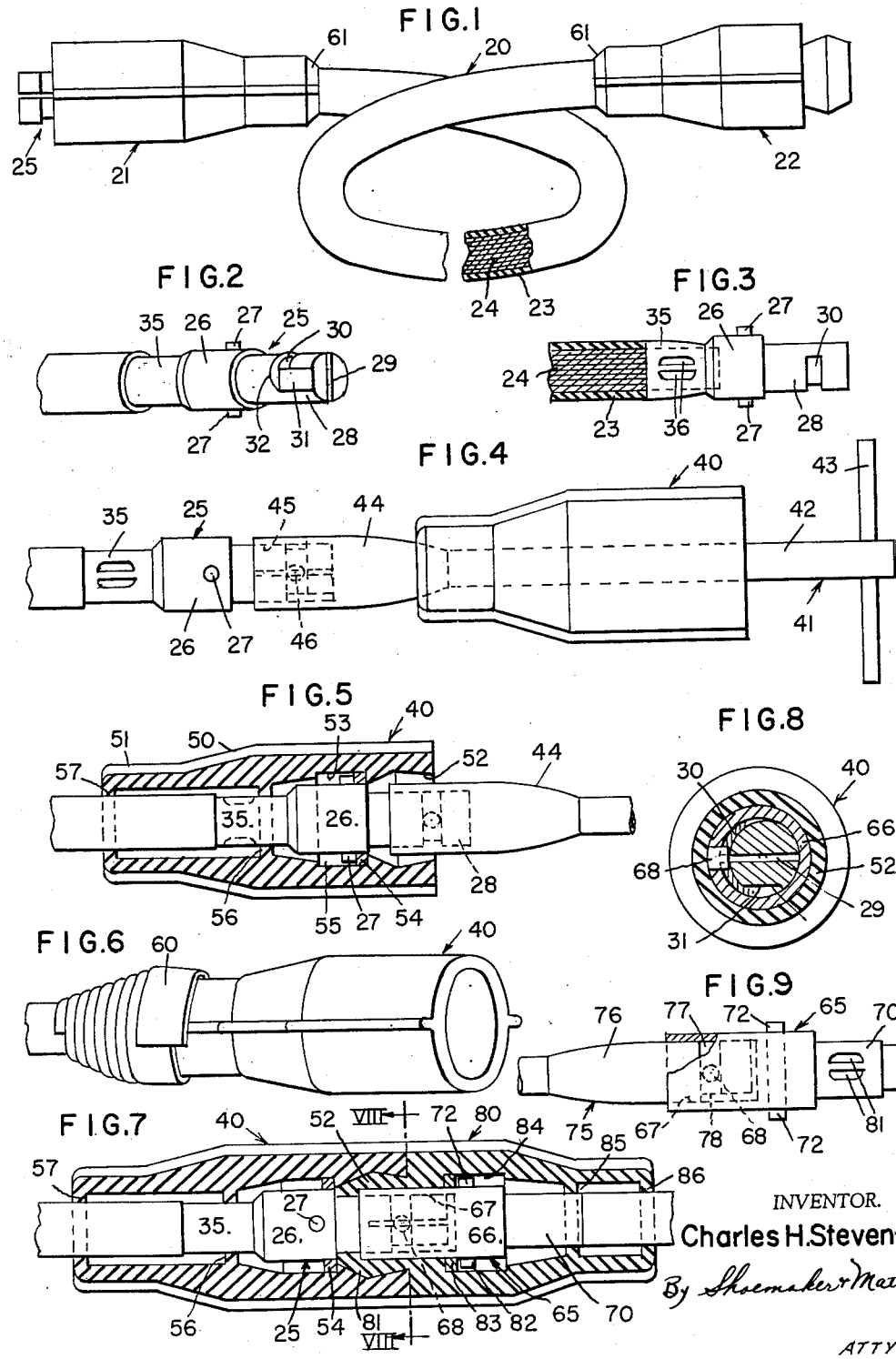

The present invention relates to a cable connector assembly and more particularly to such an assembly wherein a fluid tight joint is provided between a pair of connected cable ends.

The present application is a continuation of copending U.S. patent application Ser. No. 722,409, filed March 19, 1958, which in turn is a division of U.S. patent application Ser. No. 461,505, filed October 11, 1954, now abandoned.

In many industrial applications, cables of varying length and size are often provided with coupling elements at the opposite ends thereof such that a number of cable lengths may be connected to one another in accordance with the requirement in a particular situation. These electrical cables are utilized for supplying an electric current to equipment which may require drawing heavy current loads and, accordingly, the cables must be well insulated to protect personnel working therewith from electrical shocks or the like. The cable connector assemblies must also provide a good electrical connection therebetween such that there will be sufficient electrical transmission therethrough.

It is especially important that the electrical connection between adjacent cable ends be fluid tight in order to prevent electrical leakage therefrom and also to prevent the entrance of moisture into the joint between the cables since such moisture will produce corrosion and excessive wear to the cables. Another difficulty encountered with connections of this type is the fact that the cable may tend to flex and subsequently break away at the point of connection between the cable end and the associated coupling element. Furthermore, cables of this type are often utilized in surroundings wherein they may extend across floors or driveways and, accordingly, be subjected to shock produced by trucks or the like which may be driven thereover, and they are also subjected to the action of oil and gasoline which come into contact with the outer surface thereof. It is, therefore, very desirable to provide a cable connector assembly which is resistant to gas and oil and which is also relatively shock proof. Since it is often desirable to connect additional cables to one another or to remove some cables from engagement with adjacent cables, the cable connector assembly must be capable of being quickly and easily connected or disconnected, and additionally should be capable of providing a connection between cables of different diameters and length without providing any special adapter means.

The present invention incorporates an arrangement wherein the cable connector assembly includes a pair of electrically conductive connector means which are adapted to be secured together by relative rotation therebetween, each of the connector means being surrounded by an insulating sleeve formed of a suitable dielectric material. Adjacent cooperating insulating sleeves comprise a male and a female member which are adapted to be engaged such that a fluid tight seal is provided between the abutting ends thereof. The remote end portions of the insulating sleeves are provided with a sealing means disposed between the ends of the sleeves and the exterior surface of the associated cables, the sealing means comprising a suitable dielectric material which is subject to vulcanization such that it is fused with adjacent portions of the sleeves and the insulation material of the cable to provide a smooth finished fluid tight joint therebetween. In this manner a good electrical contact is provided between a pair of cable ends and at the same time a fluid tight joint is provided therebetween, thereby preventing electrical leakage from the connection or the entrance of moisture into the connection.

Each of the connector means and the associated insulating sleeves are provided with cooperating means for preventing relative rotation therebetween whereby the connector assembly may be urged into operative connected position by relative rotation between the two cable ends. The cooperating means for preventing relative rotation between each electrical connector means and its surrounding insulating sleeve may take the form of a collar which is tightly fitted within the sleeve, the collar having one or more longitudinally extending slots or grooves formed therein, and the associated coupling element may be provided with an outwardly projecting means such as a pin or the like for reception in one of said slots. This means for positively preventing relative rotation prevents the sleeve from being twisted about the connector and the associated cable thereby resisting any relative rotation between the sleeve and the cable which would tend to damage or destroy the interconnection of these various parts relative to one another. This is an important problem in actual use since these sleeves and cables are often subjected to severe twisting when moving and manipulating the cables.

The cable ends are bared and connected to an end portion of each of the associated connector means, and the insulating sleeve surrounding the connector means is provided with a laterally extending wall tightly fitting said end portion of the connector means to thereby prevent flexing of the cable at the point of connection to the connector means thereby preventing the cable from breaking off at this point.

The pin and slot interconnection between the connector means and the collar or the like within the surrounding sleeve as discussed above also serves a second important purpose of the present invention in addition to preventing relative rotation between the connector and its surrounding insulating sleeve. The slots or grooves provided in the collars open toward the rear end of the associated sleeves or toward the associated cable sheath such that the connectors are inserted into the associated sleeves through the rear end portions thereof remote from the end which cooperates with another sleeve to provide a fluid tight joint between a pair of sleeves.

With this arrangement, the radially extending pins on the connector means can readily enter the slots or grooves in the collars from the rear end of the sleeve, but the forward end of such slots is closed so that it is impossible to draw the connectors forwardly of such collars beyond the point where the pins on the connectors are at the forward ends of the slots in the collars. This arrangement accordingly positively prevents relative axial movement between the connectors and the surrounding sleeves in one direction. There is a great tendency for the connector to move forwardly relative to the sleeve in use, and accordingly, it is important to provide a supplementary means for preventing such relative axial movement between these components. In normal usage of the cable connector assembly of the present invention, these cables are often dragged from place to place merely by grasping an intermediate portion of the cable and tugging on the cable. Oftentimes, the sleeve portion may engage some obstruction whereupon careless personnel are liable to yank at the cable to free the sleeve, and furthermore when an outward force is applied to one of the coupler connector means tending to pull it through the open forward end of the sleeve, there is a tendency for the connector means and its attached cable to actually move forwardly relative to the insulating sheath of the cable, and in the absence of a positive means for preventing relative axial movement between the connector means and the sleeve the connector means and its attached cable may be drawn completely out of the surrounding insulating sleeve. This condition has been actually found to exist in practice, and accordingly, the pin and slot interconnection as discussed above serves the additional important function of preventing such relative axial movement which, of course, would cause the device to be completely ineffective for its intended purpose.

The arrangement according to the present invention also provides a connection which is resistant to gas and oil and is relatively shock-proof since it is compact and very sturdy in construction. The device may be quickly and easily connected or disconnected, and cables of different sizes can be connected to one another without the utilization of any special adapter means.

An object of the present invention is to provide a cable connector assembly wherein there is no relative rotation between the connector means and the associated insulating sleeves thereof.

Another object of the invention is the provision of a cable connector assembly including means for positively preventing relative axial movement of the connector means forwardly of the surrounding insulating sleeve.

A further object is to provide a cable connector assembly which prevents flexing of the cable at the point of connection to the connector means.

Yet another object is the provision of a cable connector assembly which is gas and oil resistant and shock-proof.

A still further object is to provide a cable connector assembly which may be readily connected or disconnected and is adapted to connect cables of varying sizes to one another.

Other objects and many attendant advantages of the invention will become more evident when considered in connection with the following specification and accompanying drawing wherein:

FIG. 1 illustrates a length of cable of the type with which the present invention is concerned, the central portion of the same being broken away;

FIG. 2 illustrates, in perspective, a metal connector means secured to the bared end portion of the cable core;

FIG. 3 is a side view partly in section of the device shown in FIG. 2 illustrating the manner of connection between the connector means and the bared cable end;

FIG. 4 illustrates the manner in which the connector means is inserted within the associated insulating sleeve;

FIG. 5 is a view illustrating the connector means in operative position within its associated insulating sleeve, the connector means being shown in elevation and the insulating sleeve being shown in section;

FIG. 6 is a perspective view illustrating the manner of applying the sealing means between the insulating sleeve and the cable;

FIG. 7 is a view showing the connector assembly in engaged position, the connector means being in elevation and the insulating sleeves being in section;

FIG. 8 is a sectional view taken on line VIII—VIII of FIG. 7 looking in the direction of the arrows; and FIG. 9 is a view partly broken away illustrating one of the connector elements and a puller tool attached thereto.

Referring now to the drawings wherein like reference characters represent corresponding parts throughout several views, there is shown in FIG. 1 a length of cable indicated generally by reference numeral 20 including coupling means indicated generally by reference numerals 21 and 22 positioned at opposite ends thereof, the cable having an insulating covering 23 and a wire core 24 disposed therein for carrying the electrical current throughout the cable.

Referring to FIG. 2, a connector means indicated generally by reference numeral 25 includes an enlarged cylindrical portion 26 having two diametrically opposite radially extending pins 27 formed thereon, and a reduced end portion 28 extends forwardly of cylindrical portion 26. The outermost end portion 28 has a longitudinally extending slot 29 formed therein and a groove 30 extends circumferentially partially around end portion 28. A longitudinally extending recess portion 31 extends from the outer end of end portion 28 to a shoulder 32 thereof whereby it connects with groove 30. As seen more clearly in FIG. 3, the rearwardly extending portion 35 of the connector means comprises a hollow thimble member formed of soft metal, such as brass or the like, whereby it may be crimped as indicated at 36 into engagement with the bared end portion of the associated cable end. Preferably, the insulation about the cable is removed to such an extent that when the cable end is crimped into engagement with thimble 35, the insulation of the cable will abut against the outer end portion of the thimble.

Referring to FIG. 4, the manner of assembling the connector means shown in FIGS. 2 and 3 within an associated insulating sleeve is illustrated. A hollow insulating sleeve is indicated generally by the reference numeral 40 and a puller tool indicated generally by reference numeral 41 is inserted through the insulating sleeve from the larger end thereof. The puller tool 41 comprises an elongate shaft 42 having a laterally extending handle 43 at one end thereof adapted to be manually grasped for operating the tool. The opposite end portion of the tool comprises an enlarged head 44 having a cavity 45 formed therein adapted to receive the outer end portion 28 of connector means 25. A radially extending lug 46 is provided within cavity 45 of the puller tool and is adapted to slide along groove 31 of connector means 25 and thence into groove 30 thereof upon relative rotation of the tool with respect to the connector means. In this manner, the puller tool is locked to the connector means and the connector means may be thereupon pulled longitudinally into the insulating sleeve after application of a suitable lubricant, such as toluene or the like, to the outer surface of head 44 of the puller tool and the inner surface of the insulating sleeve.

Referring now to FIG. 5, the connector means is illustrated as being in proper operative position within the insulating sleeve 40. The insulating sleeves of the present invention are formed of a suitable dielectric material which is also resistant to gasoline and oil, such as neoprene, rubber or the like. Sleeve 40 has a longitudinally extending passage therethrough, and the outer surface thereof is tapered as indicated at 50 to a reduced end portion 51. The insulating sleeve 40 is the female element of the connector assembly and is provided with an oppositely tapered cavity 52 for receiving the male connector member. An enlarged cavity 53 is provided within the insulating sleeve and a substantially cylindrical collar 54 is tightly fitted therein, the collar being provided with longitudinally extending slots 55 formed in diametrically opposite portions thereof and tightly receiving the radially extending pins 27 formed on the connector means.

It will be noted that slots 55 open toward the rear portion of the sleeve or toward the insulating sheath of the cable. This, of course, permits the pins 27 to enter the slots 55 as the connector means is drawn into the insulating sleeve from the position shown in FIG. 4 to that shown in FIG. 5.

It will also be noted that the forward ends of slots 55 terminate a substantial distance from the forward end portion of the collar 54 or in other words the forward ends of slots 55 are closed thereby positively preventing forward movement of pins 27 relative to the collar and surrounding sleeve beyond that position shown in FIG. 5. This will obviously prevent relative movement of the connector means forwardly of the surrounding sleeve as such movement is positively prevented by interengagement of the pins and the solid portion of the collar means which is formed of a suitable rigid material such as metal, plastic and the like. It is evident that the material of the sleeve is not sufficiently rigid to prevent such relative axial movement of the connector means and sleeve in the absence of this intercooperation between the pins and the collars since the sleeve is sufficiently flexible to permit relative axial movement between the connector means and the sleeve as is for example necessary in assembling the apparatus.

A laterally extending wall 56 is provided within the insulating sleeve 40 and tightly fits about the outer surface of thimble portion 35 of the connector means whereby the point of connection between the cable and the connector means is firmly supported thereby preventing flexing of the cable at this point. An end wall 57 is provided at the remote end portion of the insulating sleeve and tightly fits about the outer surface of the insulating portion of the cable for supporting the cable at this point for additionally preventing excessive flexing of the cable adjacent the end thereof. It is evident that after insertion of the connector means within the insulating sleeve, the puller tool may be removed from engagement with the connector means by relative rotation therebetween and subsequent longitudinal movement of the puller tool away from the connector means.

Referring now to FIG. 6, the manner of completing the connection between insulating sleeve 40 and associated cable is illustrated. A sealing means of suitable dielectric material, such as rubber or the like and preferably in the form of a tape, is wrapped as shown between the outer surface of the cable and the outer surface of the rear end portion of the insulating sleeve. The sealing means and adjacent portions of the cable and sleeve are thereupon subjected to vulcanization to fuse these portions together and provide a smooth joint therebetween as indicated by tapered portions 61 shown in FIG. 1. Prior to vulcanization, the insulation covering of the cable is preferably roughened by a suitable tool to remove all wax from the surface thereof, and after vulcanization any excess material may be removed from the vulcanized joint.

As seen in FIG. 7, connector means 25 is adapted to be connected with a cooperating connector means 65 including a cylindrical portion 66 having a cavity 67 formed therein which is provided with a radially extending lug 68. When in operative position as shown in FIG. 7, lug 68 is disposed within circumferential groove 30 of connector means 35 to firmly connect the two connector means together, and the outer surface of end portion 28 of connector means 25 tightly fits within cavity 67 of the connector means 65 to provide a good electrical connection therebetween. The manner of engagement of the pin 68 of connector means 65 within the groove 30 of connector means 25 may be seen in greater detail in FIG. 8.

Connector means 65 is also provided with a thimble 70 similar to thimble 35 of connector means 25 and is adapted to be crimped as at 71 to the bared end of the associated cable. Cylindrical portion 66 is provided with diametrically opposite radially extending pins 72 for a purpose hereinafter described.

A puller tool indicated generally at 75 is provided with an enlarged end portion 76, the outer end of which is provided with a circumferentially extending groove 77 and a longitudinally extending cutout portion 78 in a manner similar to the end portion 28 of connector means 25. Puller tool 75 is adapted to be engaged within the cavity 67 of connector means 65, pin 68 seating in groove 77. Connector means 65 may be thereupon inserted within the male insulating sleeve indicated generally by the reference numeral 80 in a manner similar to that in which connector means 25 is inserted in insulating sleeve 40. Forwardly extending portion 81 of insulating sleeve 80 seats within cavity 52 of insulating sleeve 40 to provide a fluid-tight connection between abutting ends of the insulating sleeve. Sleeve 80 is provided with an enlarged recess 82 within which is tightly fitted a substantially cylindrical collar 83 having a pair of longitudinally extending slots 84 formed in diametrically opposite portions thereof and tightly receiving the pins 72 of connector means 65.

It will be noted that the slots 84 in collar 83 open toward the rear end portion of sleeve 80 or toward the insulating sheath of the associated cable while the forward ends of slots 84 are closed. The purpose of this construction in cooperation with the pins 72 is identical with that discussed in connection with the interrelationship of slots 55 and pins 27. That is to say, pins 72 permit the connector means to be inserted within the sleeve 80 from the rear portion of the sleeve while at the same time preventing further relative forward movement of the connector means with respect to the surrounding sleeve once pins 72 have reached the forward closed end of the associated slots 84.

A laterally extending wall 85 of sleeve 80 tightly fits about the outer surface of thimble portion 70 for preventing flexing of the cable at this point and an end wall 86 of sleeve 80 tightly fits about the exterior surface of the insulated portion of the associated cable end for additionally preventing flexing of the cable adjacent the end thereof. A suitable dielectric material similar to rubber tape 60 shown in Fig. 6 is then applied between the remote end portion of sleeve 80 and the outer surface of the associated cable for providing a vulcanized fluid-tight joint therebetween. In this manner, each of the insulating sleeves is provided with a sealing means at the remote ends thereof which is effected by vulcanization as seen most clearly in the finished product shown in FIG. 1.

It is evident that the intercooperation of pins 27 with slots 55 and pins 72 with slots 84 serves the dual function of preventing relative rotation between the connector means and the associated sleeves as well as preventing relative axial movement of the connector means with respect to their associated sleeves in one direction. This prevents the connector means and/or the sleeves from being torn away from the cables or cable sheaths during normal usage of the cables wherein the various components are subjected to heavy twisting and tugging forces thereon.

While diametrically opposite pins and slots have been illustrated for accomplishing the above purposes, it is also apparent that pins and slots need not necessarily be disposed diametrically opposite one another and in some instances a single pin and slot interengagement between the connector means and the collar may be sufficient for accomplishing the dual function as discussed above. It is also apparent that if desired the slot portion could be provided on the outer surface of the connector means while an inwardly extending pin member could be provided on the collar, but it is felt that the arrangement as disclosed is the most practical one.

It is apparent from the foregoing that there is provided a new and novel cable connector assembly which provides a fluid tight connection between a pair of cable ends and gives good electrical contact therebetween, yet prevents moisture from entering the connection, thereby insuring long life of the cables. A means is provided for preventing relative rotation between each of the connector means and its associated insulating sleeve, and this means also serves a second and important function of preventing relative axial movement between each of the connector means and its associated insulating sleeve in one direction. Laterally extending walls are provided within the sleeves for engaging the connector means and preventing excessive flexing of the cables adjacent the end portions thereof. The connector assembly is gas and oil resistant and relatively shock-proof, and may be readily connected or disconnected. It is evident that the connector means and associated insulating sleeves may be attached to any size cable, thereby enabling different size cables to be connected to one another.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A cable connector assembly including a separate hollow preformed elongated and resilient sleeve having a central bore formed longitudinally therethrough and opening through opposite ends of said sleeve, an electrically conductive metallic coupling element removably positioned within the bore in said sleeve, said coupling element being electrically connected to an insulated electric cable, said sleeve having a forward end portion and a rearward end portion, said coupling element having a end portion interengageable with a cooperating coupling element to provide an electrical connection, and interengageable means for performing the dual function of preventing relative rotation and relative axial movement in one direction between said coupling element and its associated surrounding sleeve, said interengageable means including a rigid member supported by said sleeve and held against relative rotation and relative axial movement with respect thereto, said rigid means having slot means formed therein opening toward said rearward end portion of the sleeve, said slot means being closed at the forward end thereof toward said forward end portion of the sleeve by an integral part of said rigid member, said coupling element including rigid means fixed thereto extending radially outwardly thereof and slidably and snugly received within said slot means such that when assembling the assembly said coupling element may be initially drawn into the bore in said sleeve through the open end of the bore at said rearward end portion of the sleeve whereupon said outwardly extending rigid means on the coupling element may be slid into said slot means through the open end thereof and seated in its normal operative position at the forward closed end of said slot means to thereby subsequently positively prevent any relative rotation between said coupling element and said sleeve or any further relative axial movement of said coupling element through said bore toward the open end of said bore at said forward end portion of the sleeve.

2. A cable connector assembly as defined in claim 1 including sealing means engaged at said rearward end portion of said sleeve with the insulated cable to provide a fluid-tight seal thereat.

References Cited in the file of this patent

UNITED STATES PATENTS

| | | |
|---|---|---|
| 971,363 | Doyle | Sept. 27, 1910 |
| 2,030,080 | Waldron | Feb. 11, 1936 |
| 2,034,695 | Dougherty | Mar. 24, 1936 |
| 2,336,732 | Howard | Dec. 14, 1943 |
| 2,357,719 | Hoban | Sept. 5, 1944 |
| 2,383,926 | White | Aug. 28, 1945 |
| 2,396,872 | Miller et al. | Mar. 19, 1946 |
| 2,448,509 | Antony et al. | Sept. 7, 1948 |
| 2,501,674 | Graham | Mar. 28, 1950 |
| 2,742,622 | Stevens | Apr. 17, 1956 |
| 2,758,291 | Richards | Aug. 7, 1956 |
| 2,760,579 | Kabakoff | Aug. 28, 1956 |
| 2,904,769 | Sampson | Sept. 15, 1959 |
| 2,907,973 | Stevens | Oct. 6, 1959 |

FOREIGN PATENTS

| | | |
|---|---|---|
| 490,013 | Great Britain | Aug. 5, 1938 |